United States Patent
Noll et al.

[15] 3,656,908

[45] Apr. 18, 1972

[54] METHOD OF DETERMINING THE CHROMIUM CONTENT OF AQUEOUS MEDIUMS

[72] Inventors: Charles A. Noll, Philadelphia; Edward C. Feddern, West Chester, both of Pa.; Louis J. Stefanelli, Pennsauken, N.J.

[73] Assignee: Betz Laboratories, Inc., Trevose, Pa.

[22] Filed: Dec. 1, 1970

[21] Appl. No.: 94,181

[52] U.S. Cl. ................................23/230 R, 252/408
[51] Int. Cl. ...............G01n 21/20, G01n 21/24, G01n 33/18
[58] Field of Search................23/230, 253, 253 TP; 252/408

[56] References Cited

OTHER PUBLICATIONS

Aikens, D. A. et al., Analytical Chemistry, Vol. 34, pp. 1707–1709 (1962)

Crisan, I. A. et al., Analytical Abstracts, Vol. 15, No. 6624 (1968)

Primary Examiner—Joseph Scovronek
Assistant Examiner—Elliott A. Katz
Attorney—Alexander D. Ricci

[57] ABSTRACT

Method of determining the chromium concentration in an aqueous medium containing either or both trivalent chromium or hexavalent chromium. The method generally entails acidifying the aqueous medium, oxidizing any trivalent chromium present in the aqueous medium to hexavalent chromium, and adding to the medium a composition comprising a water-soluble cobaltous salt and a chelating agent of the acetic acid derivative type. The color intensity of the resulting medium is then measured and compared to the intensity of samples of aqueous medium containing known quantities of chromate in its hexavalent state which have been treated in the same manner. One of the other features of the invention is the composition used in the method.

20 Claims, No Drawings

METHOD OF DETERMINING THE CHROMIUM CONTENT OF AQUEOUS MEDIUMS

BACKGROUND OF THE INVENTION

The technology of water treatment industry has reached a high degree of sophisitication. Presently many many compositions are utilized in order to protect the metallic parts of large and expensive steam producing apparatus, cooling systems and water conveying means. In fact, wherever water is present and in contact with a metal structure, corrosion or scale deposition becomes a very significant problem. The areas of concern range anywhere from the metallic structure of the cooling water tower to the drilling or fractionating apparatus utilized in oil fields.

Chromates such as sodium chromate or sodium bichromate have found extensive use either alone or in combination with other materials in the control of corrosion particularly in cooling water systems and in some instances, in small low-pressure boiler systems. To date the most effective treatments are for the chromate based treatments.

However, as with all treatments of water systems, it is extremely important to maintain the systems under strict control. This is necessary from a number of standpoints. For example, chemicals which can be used successfully in water treatment under certain treatment levels may act detrimentally to the systems when added in large amounts. In effect the overfeed of the chemical transposes the chemical or its by-products into a contaminant which must be reckoned with since they may enhance scale formation, effect cycles of concentration and accordingly require excess blowdown which operates adversely to the economics of the system.

More recently the pollution aspects from the discharge of effluents from industrial systems have been under strict surveillance. Because of the concern regarding contaminating discharges, it has become most important to utilize only the exact amount of chromate for the specific purpose. Accordingly, quick, simple and effective methods are desirable in order to ascertain the residual level of chromate in a particular water system. In the same vein, it is desirable to have a simple method for measuring the chromate content not only of effluents but also of streams, ponds, lakes, etc., to ascertain whether in fact these natural waters have been contaminated.

The chromium compound which has found extensive use as a corrosion inhibitor is the hexavalent chromate salt. This form also is the most toxic form to marine life. Although the trivalent chromium salts are less toxic, they are also of concern. In some instances the hexavalent form is reduced during residence time in a particular system to the trivalent form and when total chromium content of an aqueous medium is to be determined, this factor must be taken into account.

There are presently used many tests for the determination of chromium concentration in aqueous systems. One such test requires the use of a very sensitive reagent, diphenyl carbazide. However, it is extremely difficult to keep this reagent stable even in various solvents since the mere presence of trace quantities of water in the reagent caused its polymerization and consequently rendered it useless. Accordingly, fresh solutions of the reagent had to be produced at short intervals which in turn made the tests somewhat cumbersome. In addition the method utilizing this reagent required large dilutions of the sample, as high as 50 times in some cases, making use of large multiplying factors necessary and, of course, compounding the error. In addition, if total chromium content was desired, the sample had to be acidified, and boiled with permanganate to oxidize trivalent chromium to its hexavalent state. This was dangerous, cumbersome and time consuming. The method routinely used to determine chromate concentration is the potassium iodide—sodium thiosulfate method. According to this well-known method potassium iodide was added to the sample containing the chromate and free iodine was liberated.

The free iodine was titrated with sodium thiosulfate and the amount of chromate determined by calculation. Although the procedure was generally considered to be adequate, it does possess its built-in errors and limitations. For example, the test method is at best tedious and is inaccurate if in fact chlorine or chloramine was present in the sample.

From the foregoing then it was evident to the present inventors that a new test procedure must be devised. The method had to be free of the attendant disadvantages found with the procedures currently used. Moreover the procedure had to be rather simple, non-time consuming, safe and capable of being run by someone who was not necessarily chemically educated or trained. Basically the procedure had to be one which a water-systems operator could follow quickly and easily so as to permit a number of tests to be conducted over a short period of time.

GENERAL DESCRIPTION OF THE INVENTION

The present inventors ascertained that the foregoing objectives could be fully realized by utilization of the method as hereinafter described. The method can be used to determine the amount of trivalent, hexavalent and/or the total chromium content of an aqueous system.

In the event that one is interested in determining the total chromium content of an aqueous medium, i.e., trivalent and hexavalent chromium, a sample of the aqueous medium is first acidified preferably to a pH of from about 1 to about 3 with a mineral acid. To the medium is then added a water-soluble ceric salt wherein the ceric cation has a valence of 4. The ceric salt is added in a quantity sufficient to and allowed to stand in said medium for a time sufficient to allow oxidation of any trivalent chromium to hexavalent chromium. To said medium is then added a composition comprising a water-soluble cobaltous salt and a chelating agent of the group consisting of acetic acid derivatives and their alkali metal salts, i.e., sodium and potassium and their equivalent, ammonium salt. After a short time a distinct color develops which color and its intensity are compared to known standards.

Although the above-described method is directed to "total chromium" concentration of an aqueous system, it is apparent that if one is desirous of determining either the trivalent chromium or hexavalent chromium, the test procedure can be modified to fit the purpose.

For example, if one were interested in determining the hexavalent chromium concentration, one would not add the ceric salt to oxidize the trivalent chromium present but would add directly after acidifying the composition comprising the cobaltous salt and the chelating agent. The reading or comparison would then be a direct reading of the hexavalent chromium content since no reaction or color is obtained with the trivalent chromium.

If one were interested in ascertaining the trivalent chromium content, he would first determine the hexavalent chromium content of a sample medium as described above and then the total chromium content of a second sample of the medium and the difference, of course, is the trivalent chromium concentration.

According to the process, a mineral acid is used for the acidification of the sample. These acids, of course, include nitric acid, phosphoric acid, sulfuric acid and hydrochloric acid. The use of mineral acids in the present process permits not only the determination of high concentrations of hexavalent chromium but also reproducibly allows accurate determinations for systems containing hexavalent chromium at 10 ppm and below. As earlier stated, the pH of the sample aqueous medium should be within the range of from about 1 to about 3 and preferably from 1.6 to 2.0.

The water-soluble ceric salt generally may be any ceric salt wherein the ceric cation is in a valence state of 4. Preferably the ceric salt is ceric sulfate, ceric nitrate, ceric chloride or ceric phosphate.

The cobaltous salt may be any one which is water soluble such as cobaltous nitrate, cobaltous sulfate, cobaltous phosphate and cobaltous chloride.

The water-soluble chelating agent may be any which together with the cobalt react to produce a chromate-cobalt-chelate complex which possesses a color. Preferably the chelating agent is of the acetic acid derivative type, such as 1,2-diaminocyclohexane tetra acetic acid, diethylene triaminopenta acetic acid, ethylenediamine tetra acetic acid and the nitrilo acetic acids (e.g. nitrilotriacetic acid) and the alkali metal and ammonium salts thereof.

The composition comprising the cobaltous salt and the chelating agent has no critical parameters excepting that it should be such as to contain at least 1 part by weight of the cobaltous salt for 7 parts by weight of the chelating agent. This means simply that the composition may contain 2, 3 or 4 parts cobaltous salt and only 7 parts of chelating agent. So long as at least 7 parts of chelating agent is combined with at least 1 part cobaltous salt, the composition is operable.

The composition which may be aqueous, is added to the test solution in an amount sufficient to react all of the hexavalent chromium with the cobalt and chelate to form what is believed to be the colored compound: $CO\ [C.A.]_7\ Cr_2O_7$, where C.A. represents the chelating agent.

The amount of compound present of course determines the color of the solution, which in turn permits the accurate measurement of the trivalent chromate.

At this time, it would probably be advisable to point out that in using the test method of the present invention that certain standardizations must be made. The entire substance of the method resides in the measurement either electronically or by visual comparison of the color intensity of the sample solution which has been treated according to the present invention.

More specifically, a certain proportion of the test solutions when utilized in conjunction with a certain amount of the liquid samples will yield a distinct color intensity. The color intensity may then be measured or compared to the intensity of solutions which contain known quantities of hexavalent chromate and which have been treated in accordance with the test procedure. In this manner the concentration of the hexavalent chromium in the sample can easily be ascertained. However, more economically and as customarily utilized in the field, Taylor slides are produced which slides are the same in color intensity as the color of the corresponding samples of liquid containing known concentrations of polyphosphate or complex phosphate. The sample solution can then be compared visually with the Taylor slides. The use of Taylor slides has been very successful in other areas and works equally well in the present invention. Moreover, the use of Taylor slides adds a distinct advantage in that it is economical and does not require electronic equipment to make on-the-spot determinations.

If desired, the color intensity may be measured electronically such as with a Leitz-Rouy photometer with a 415 millimicron filter. The procedure utilizing this method of determining chromium concentration merely entails taking readings in "dials" on a blank of the sample of aqueous medium, carrying out the inventive test procedure on another sample, making a reading in "dials" on the photometer and comparing the reading minus the blank reading to readings obtained by using samples containing known amounts of hexavalent chromate which have been treated in accordance with the inventive method. A standard chart is prepared using this technique. This method affords rapid and accurate results.

Having thus generally described the invention, more specific examples are set forth below.

EXEMPLARY TEST PROCEDURE

Chemicals Required
 Ceric Sulfate
 Sulfuric Acid
 Cobaltous Chloride
 Ethylenediamine tetra sodium acetate
Apparatus Required
 1. Leitz-Rouy photometer with 415 millimicron filter
 2. A supply of optical cells (20 × 20 mm, matched)

Preparation of Reagents
 Cobalt Reagent: 8 grams of cobaltous chloride were weighed out and dissolved in 1,000 ml of distilled water. To the cobalt solution was then added 30 grams of ethylenediamine tetra sodium acetate. The resulting solution was stirred until free of solids.
 Acid Reagent: 7 grams of ceric sulfate were weighed out and mixed into one liter of 2 normal sulfuric acid and stirred until dissolved.

PROCEDURE FOR CHROMATE (HEXAVALENT)

By means of a pipette 25 ml of an aqueous medium container was filtered and poured into a beaker. To the beaker was added 1 ml of the 1N sulfuric acid. 1 ml of the cobalt reagent was then added to the sample and stirred. A timer was set for 5 minutes to allow for complete reaction. The sample was then poured in one of the matched cells, placed into a photometer and a reading in "dials" taken. The dial reading is referred to the standard chart and the ppm of hexavalent chromate recorded.

Reagent Blank: The same ingredients as described above were added to a 25 ml sample of distilled water and allowed to stand for 5 minutes. The sample was then measured for color intensity by means of the photometer to obtain a "dial" reading for the blank. The difference between the sample dial reading and the blank reading, of course, is the actual dial reading which when referred to a standard curve exceeds a ppm chromate reading.

PROCEDURE FOR TOTAL CHROMATE

Twenty-five ml of a sample was mixed with 1 ml of the ceric sulfate reagent, stirred and allowed to stand for approximately 20 minutes. One ml of the cobalt reagent was then added, stirred and allowed to stand for approximately 5 minutes. The sample was then poured into a matched cell and a reading taken using the photometer.

Reagent Blank: to 25 ml of distilled water was added 1 ml of ceric sulfate reagent. The solution was stirred and allowed to stand for 20 minutes after which 1 ml of cobaltous reagent was added, stirred and allowed to stand. The sample was poured into a matched cell, placed in the photometer and a blank reading in "dials" was made.

Again the difference between the blank dial reading and the sample dial reading is the actual reading which when referred to the standard curve chart will exceed a direct ppm chromate reading.

PREPARATION OF STANDARD CURVES

Chromate Curve
 Pure potassium dichromate ($K_2Cr_2O_7$) solutions were made in duplicate in accordance with standard procedures. The solution as $CrO_4$ was produced so as to contain in the chromate in the following parts per million:

| | |
|---|---|
| 0.0 | 20.0 |
| 5.0 | 30.0 |
| 10.0 | 40.0 |

Twenty-five ml samples of these samples were used and tested according to the procedure outlined above for "chromate." The "dial" readings versus the ppm of $CrO_4$ were plotted on graph paper.

Total Chromate Curve
 Standard chromate solutions were prepared and contained chromium as chromate as follows:

| | |
|---|---|
| 0.0 | 2.0 |
| 0.5 | 2.5 |
| 1.0 | 3.0 |

Twenty-five ml of these samples were tested in accordance with the procedure outlined above for "total chromate" and the "dial" readings versus ppm $CrO_4$ were plotted.

The readings versus chromate concentrations were as follows:

TABLE I

Chromate

| ppm CrO$_4$ | Dial Readings |
|---|---|
| 0 | 0 |
| 0 | 0 |
| 5.0 | 44 |
| 5.0 | 44 |
| 10.0 | 92 |
| 10.0 | 90 |
| 20.0 | 180 |
| 20.0 | 181 |
| 30.0 | 272 |
| 30.0 | 274 |
| 40.0 | 360 |
| 40.0 | 360 |

TABLE II

Total Chromate

| ppm Cr (trivalent) as CrO$_4$ | Dial Readings |
|---|---|
| 0 | 0 |
|  | 0 |
| 0.5 | 5 |
| 0.5 | 5 |
| 1.0 | 10 |
| 1.0 | 10 |
| 2.2 | 20 |
| 2.2 | 20 |
| 2.5 | 25 |
| 2.5 | 25 |
| 3.0 | 31 |
| 3.0 | 30 |

Specific Examples

In order to ascertain the relationship of the inventive method with the other methods of determining chromate concentration and the accuracy of the present method, actual samples of cooling waters from industrial concerns were obtained. In some instances the same concern may have had a number of cooling water towers. Accordingly, samples were obtained from each. Each of the samples contained a solubilized chromium concentration and accordingly were subjected to the procedures outlined earlier for "total chromate." For comparative purposes the samples were also subjected to the potassium iodide—sodium thiosulfate method of analyses excepting as noted. The values noted with an asterisk were obtained using the diphenyl carbazide method in a 1:40 to 1:50 dilution since the sample contained too much chlorine or chloramine to use the iodide-thiosulfate method.

The data obtained is set forth in Table III which follows:

TABLE III

| Samples From | ppm CrO$_4$ by KI, Na$_2$S$_2$O$_3$ Method | ppm CrO$_4$ by Present Method |
|---|---|---|
| Company A | 27 | 26 |
| Company B | 98 | 102 |
| Company B | 40* | 36 |
| Company A | 92* | 89 |
| Company B | 34 | 36 |
| Company C | 31 | 26 |
| Company D | 17 | 14 |
| Company E | 492 | 500 |
| Company E | 67* | 60 |
| Company F | 25 | 24 |
| Company G | 123 | 126 |
| Company G | 118 | 117 |

From the foregoing tabulation of results, it is apparent that the present method does in fact produce the results as the methods currently used by the industry and that these results can be obtained more simply, more quickly and without the need of special handling techniques.

Although the inventive method has been illustrated only with certain species of the various reagents, it has been ascertained that the method is operable for example when the other mineral acids, cobaltous salts, ceric salts and chelating agents disclosed were substituted for those of the specific example.

Having thus described our invention, what we claim is:

1. A method of determining the hexavalent chromate concentration of an aqueous medium which comprises acidifying said medium with a mineral acid, adding to said aqueous medium a composition comprising a water soluble cobaltous salt and a water-soluble chelating agent selected from the group of acetic acid derivatives and the alkali metal salts of said derivatives, wherein said composition contains at least 1 part by weight of said cobaltous compound for each 7 parts by weight of said chelating agent, and ascertaining the color intensity of the resulting solution.

2. A method according to claim 1 wherein the color intensity is ascertained by comparison with the color intensity of standard color solutions which respectively represent known chromate concentrations.

3. A method according to claim 1 wherein the aqueous medium is acidified to a pH of from about 1 to about 3.

4. A method according to claim 3 wherein said chelating agent is selected from the group consisting of 1,2-diaminocyclohexane tetra acetic acid, diethylenetriaminopenta acetic acid, ethylene diamine tetra acetic acid, nitrilotriacetic acid and the alkali metal salts thereof.

5. A method according to claim 4 wherein the aqueous medium is acidified by the addition of an acid selected from the group consisting of hydrochloric acid, sulfuric acid, nitric acid and phosphoric acid.

6. A method according to claim 5 wherein said cobaltous compound is selected from the group consisting of cobaltous chloride, cobaltous sulfate, cobaltous nitrate, and cobaltous phosphate.

7. A method for determining the concentration of trivalent chromium in an aqueous medium which comprises acidifying and adding a sufficient amount of a water-soluble ceric salt to said aqueous medium to at least oxidize the trivalent chromium of the aqueous medium to its hexavalent state, adding to said aqueous medium a composition comprising a water-soluble cobaltous salt and a water-soluble chelating agent selected from the group of acetic acid derivatives and the alkali metal salts thereof, wherein said composition contains at least 1 part by weight of said cobaltous compound for each 7 parts by weight of said chelating agent, and ascertaining the color intensity of the resulting solution.

8. A method according to claim 7 wherein the color intensity is ascertained by comparison with the color intensity of standard color solutions which respectively represent known chromate concentrations.

9. A method according to claim 7 wherein the aqueous medium is acidified to a pH of from about 1 to about 3.

10. A method according to claim 9 wherein said chelating agent is selected from the group consisting of 1,2-diaminocyclohexane tetra acetic acid, diethylenetriaminopenta acetic acid, ethylene diamine tetra acetic acid, nitrilotriacetic acid and the alkali metal salts thereof.

11. A method according to claim 10 wherein the aqueous medium is acidified by the addition of an acid selected from the group consisting of hydrochloric acid, sulfuric acid, nitric acid and phosphoric acid.

12. A method according to claim 11 wherein said cobaltous compound is selected from the group consisting of cobaltous chloride, cobaltous sulfate, cobaltous nitrate, and cobaltous phosphate.

13. A method of determining the total chromium concentration of an aqueous medium which comprises acidifying the aqueous medium to a pH of from about 1 to about 3, adding to said medium a water-soluble ceric salt to oxidize any trivalent chromium present in the hexavalent state, adding to said medium a composition comprising at least 1 part by weight of a water-soluble cobaltous salt for about 7 parts by weight of a water-soluble chelating agent selected from the group consisting of acetic acid derivatives and the alkali metal salts thereof, and ascertaining the color intensity of the resulting solution.

14. A method according to claim 13 wherein the color intensity is ascertained by comparison with the color intensity of standard color solutions which represent known chromate concentrations.

15) A method according to claim 13 wherein said aqueous medium is acidified with a mineral acid, said ceric salt is selected from the group consisting of ceric chloride, ceric sulfate, ceric phosphate and ceric nitrate, said cobaltous salt is selected from the group consisting of cobaltous chloride, cobaltous nitrate, cobaltous sulfate and cobaltous phosphate, and said chelating agent is selected from the group consisting of 1,2-diaminocyclohexane tetra acetic acid, diethylenetriaminopenta acetic acid, ethylenediamine tetra acetic acid, nitrilotriacetic acid and the alkali metal salts thereof.

16. A composition comprising at least one water-soluble cobaltous salt and a chelating agent selected from the group of acetic acid derivatives and the alkali metal salts thereof, wherein the composition contains from about at least 1 part by weight of said cobaltous compound for each 7 parts by weight of said chelating agent.

17. A composition according to claim 16 wherein the cobaltous compound is cobaltous chloride and the chelating agent is ethylenediamine tetra sodium acetate.

18. A composition according to claim 16 wherein the composition is an aqueous solution.

19. A composition according to claim 16 wherein said cobaltous salt is selected from the group consisting of cobaltous chloride, cobaltous sulfate, cobaltous nitrate, and cobaltous phosphate, and said chelating agent is selected from the group consisting of 1,2-diaminocyclohexane tetra acetic acid, diethylenetriaminopenta acetic acid, ethylene diamine tetra acetic acid, nitrilotriacetic acid and the alkali metal salts thereof.

20. A composition according to claim 19 wherein the composition is an aqueous solution.

* * * * *